United States Patent
Aangenendt

(10) Patent No.: US 9,445,579 B2
(45) Date of Patent: Sep. 20, 2016

(54) EGG-HOLDING TRAY FOR INCUBATION

(71) Applicant: Pas Reform B.V., Zeddam (NL)

(72) Inventor: Bartholomeus Franciscus Aangenendt, Best (NL)

(73) Assignee: PAS REFORM B.V., Zeddam (NL)

( * ) Notice: Subject to any disclaimer, the term of this patent is extended or adjusted under 35 U.S.C. 154(b) by 0 days.

(21) Appl. No.: 14/322,487

(22) Filed: Jul. 2, 2014

(65) Prior Publication Data
US 2015/0075440 A1    Mar. 19, 2015

(30) Foreign Application Priority Data

Jul. 5, 2013    (BR) .............................. 102013017344

(51) Int. Cl.
*A01K 41/00* (2006.01)
*A01K 41/06* (2006.01)

(52) U.S. Cl.
CPC .................................. *A01K 41/065* (2013.01)

(58) Field of Classification Search
CPC .................................................. A01K 41/065
USPC ...................... 119/322; 356/61; 206/563, 562
See application file for complete search history.

(56) References Cited

U.S. PATENT DOCUMENTS

| | | | | |
|---|---|---|---|---|
| 1,148,475 A | * | 7/1915 | Forsythe | 217/27 |
| 1,369,323 A | * | 2/1921 | Clairemont | 211/14 |
| 1,564,217 A | * | 12/1925 | Dotterer | 119/322 |
| 3,003,463 A | * | 10/1961 | De Rijcke | A01K 41/065 119/325 |
| 3,489,124 A | * | 1/1970 | Cannon | 119/322 |
| 4,004,552 A | * | 1/1977 | Levin | 119/322 |
| 4,558,661 A | * | 12/1985 | Theilig et al. | 119/322 |
| 5,816,406 A | * | 10/1998 | Jupille | B65D 1/38 206/511 |

FOREIGN PATENT DOCUMENTS

BR    PI0900248-0    10/2010

OTHER PUBLICATIONS

SmartTray Brochure, Pas Reform P.O. Box 2, 7038 ZG Zeddam, Oct. 16, 2008.

* cited by examiner

*Primary Examiner* — Kristen C Hayes
(74) *Attorney, Agent, or Firm* — Steven M. Koehler; Westman, Champlin & Koehler, P.A.

(57) ABSTRACT

An egg-holding tray for incubation intended to accommodate eggs has rectangular shape with rounded corners bordered by parallel walls. A lower part of these walls configures a protruding rectangular border. The internal area of the tray comprises a set of laterally juxtaposed aureoles with the same structure that fill the entire area of the tray. Each individual aureole includes a lower concentric ring beneath an upper ring. The lower ring has a circular shape configured to have four equidistant orthogonal supports located on the internal face which each support has a vertical triangular shape with a rounded upper end and a concave surface that correlates to the inside circumference of the lower ring. The tray accommodates eggs under the force exerted by the weight of each of the eggs prevent the egg from moving around in the aureole.

17 Claims, 7 Drawing Sheets

EGG-HOLDING TRAY FOR INCUBATION

BACKGROUND

The discussion below is merely provided for general background information and is not intended to be used as an aid in determining the scope of the claimed subject matter.

Aspects of the invention herein described relate to the incubation and inoculation of eggs.

It is known to society that eggs are incubated to increase productivity in the breeding of chickens for meat production. Incubation occurs in equipment with predefined temperature, pressure and other parameters designed to achieve good results.

Factored into the process is egg quality with regard to the size, shape and exterior conditions of the shell. Another important factor in the incubation is the turning of the eggs which must be slow and alternate in relation to the upper part of the tray. There are many models of incubator on the market, some manual and some automatic, capable of programming turns and controlling temperature and humidity by means of thermostats, hygroscopes and electronic sensors. The incubators may also have thermometers and water reservoirs and be made from synthetic materials, such as fiberglass, plastic or acrylic allowing better hygiene.

There are many existing problems in relation to egg incubation trays which affect, in particular, the output from the incubation. The known trays, due to their structure, display certain characteristics, such as small differences in the temperature in the tray area or a lack of adequate ventilation, resulting in a significant loss in production.

The applicant, who is aware of such problems and is the holder of patent application PI 0900248-0, has identified the restrictions and sought to solve the problems by developing a new egg-holding tray for incubation.

The previous patent application describes an egg-holding tray for incubation in a rectangular shape with rounded corners, the external perimeter of which, together with longitudinal and transverse internal walls, border individual egg holding units. Each egg holding unit has an aureole on the inside formed by two arcs, a right arc and a left arc, which are parallel to each other with the curvatures faced inwards towards a center of the egg holding unit, and which have a conical slope, an upper edge of the arcs having a greater diameter than a lower edge of the arc, where an outer center of the arc is tangential to a transverse wall of the tray and the ends of the arcs are fixed to the longitudinal walls; two elevations emerge from the upper edge of each arc, supporting the eggs, positioned vertically and sloped in correlation with the slope of the arcs.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

An aspect of the invention is an egg-holding tray intended to accommodate eggs. The tray comprises an array of aureoles having a lower ring concentrically below an upper ring, the lower ring having a plurality of supports on an internal face of the upper or lower ring.

In one embodiment, the supports have a concave egg supporting surface that correlates to the inside circumference of the lower ring such that it accommodates eggs under the force exerted by the weight of the egg preventing the egg from moving around in the aureole. Each support can have a triangular shape and/or a rounded upper end.

In another embodiment, an egg-holding tray for incubation intended to accommodate eggs has a rectangular shape with rounded corners bordered by parallel walls. The lower part of these walls comprise a protruding rectangular border, while an internal area of the tray includes a set of laterally juxtaposed aureoles each with the same structure that fill the entire area of the tray. Each individual aureole includes of a lower concentric ring beneath an upper ring. The lower ring has a circular shape having four equidistant orthogonal supports located on an internal face which have a vertical triangular shape with a rounded upper end and a concave surface that correlates to an inside circumference of the lower ring and is configured to accommodate an egg under a force exerted by a weight of the egg preventing the egg from moving around in the aureole.

One or more features of the tray herein provided increase output production since an ideal temperature is better maintained in the entire area of the tray. Improved ventilation can also be provided which was previously restricted to the longitudinal direction whereas in a new preferred embodiment the ventilation also occurs in the transverse direction. In one embodiment, the new shape of the aureoles with lateral cavities, a lower ring and a hexagonally-shaped upper ring impedes the movement of the eggs, increases the capacity and equally distributes the temperature. The result is a higher production output and a greater number of incubated eggs with a significant economic effect.

BRIEF DESCRIPTION OF THE DRAWINGS

Further details and advantages of the egg-holding tray for incubation follow from the description below with reference to the attached drawings showing an embodiment of the egg-holding tray for incubation by way of example, where.

DETAILED DESCRIPTION OF THE ILLUSTRATIVE EMBODIMENTS

Figure 1:
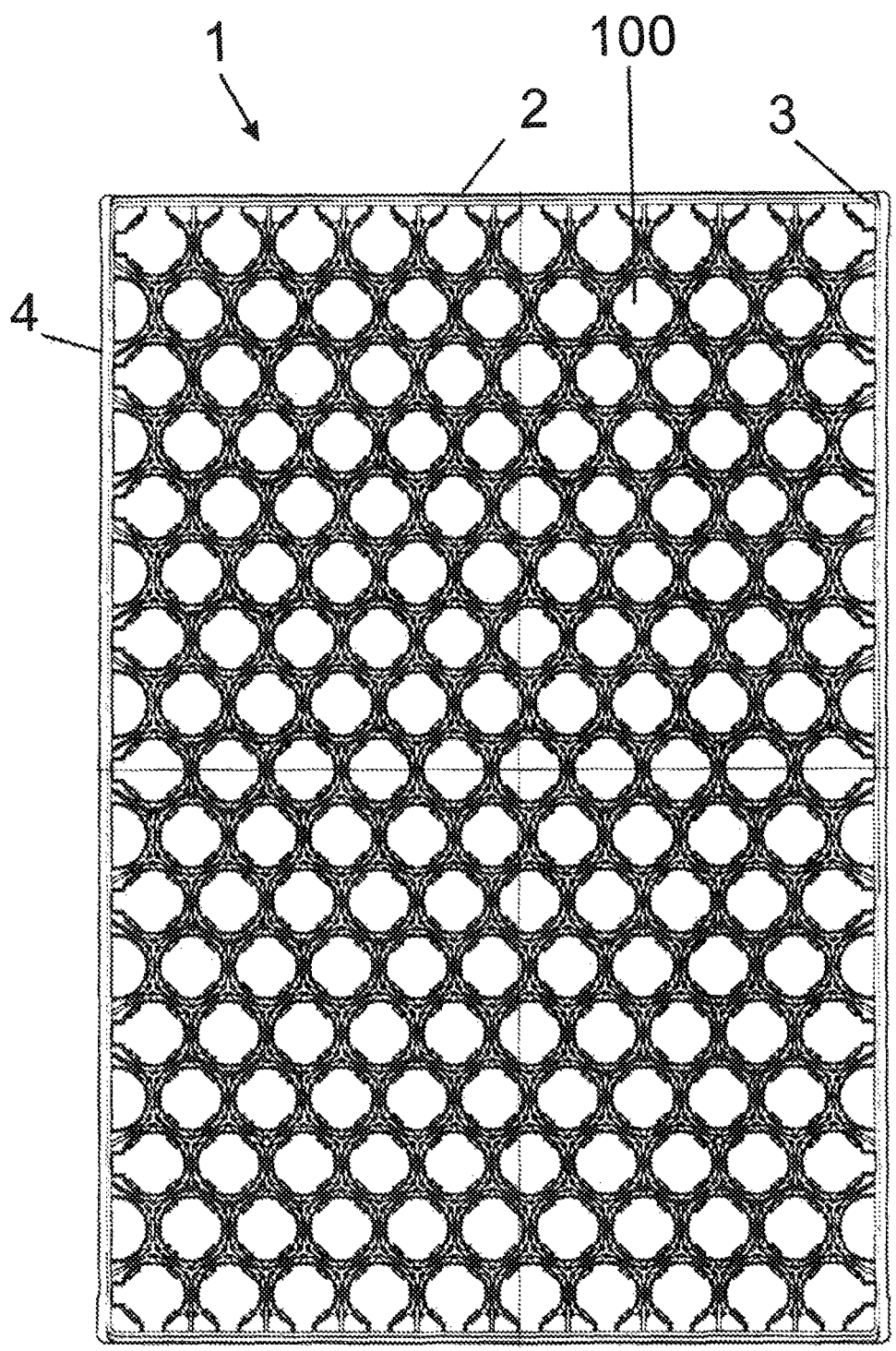
FIG. 1 depicts the top view of the tray.
Figure 2:
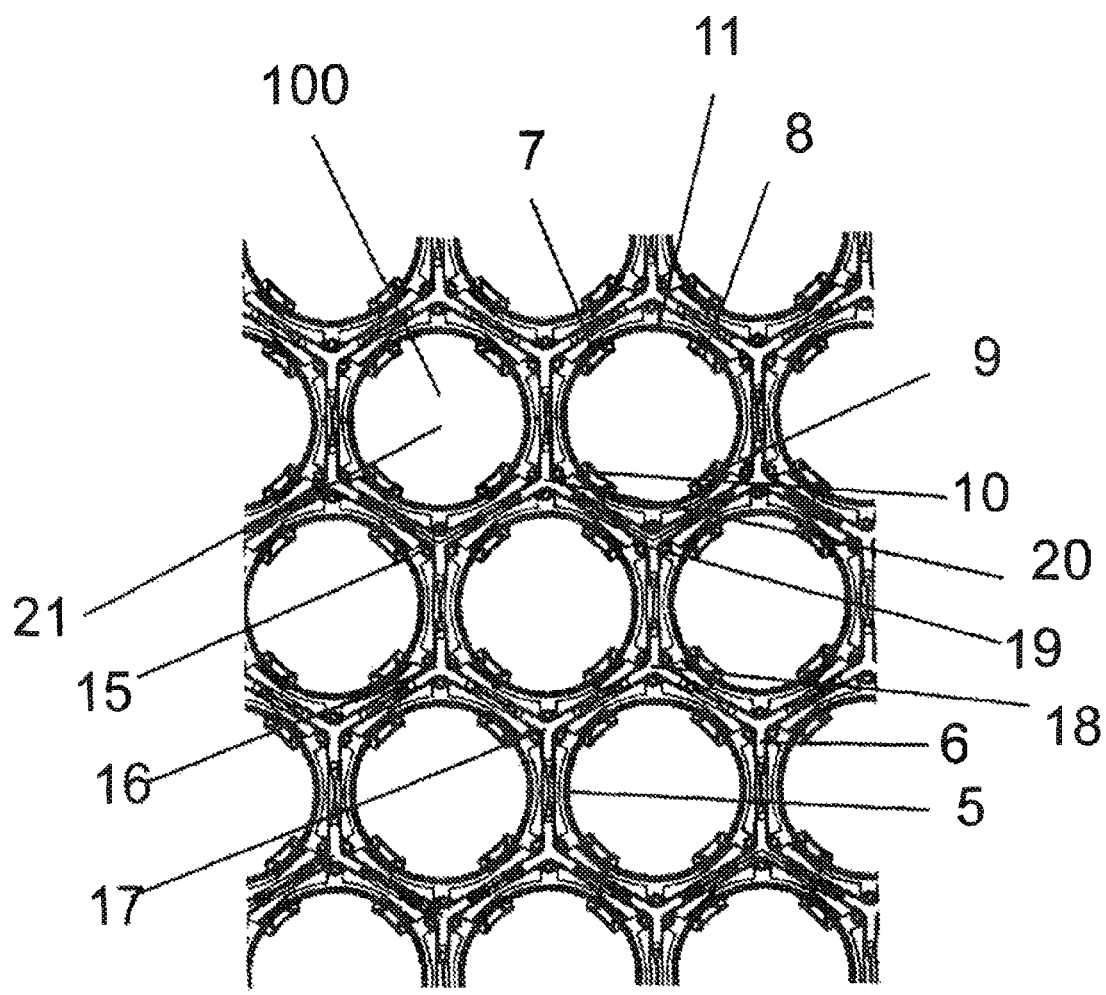
FIG. 2 depicts a view of an arrangement of the hexagonally-shaped aureoles designed to increase the incubation capacity by holding 162 eggs in a tray of the same size as the trays already known.

The following detailed description should be read and interpreted with reference to the drawings provided. These drawings are highly diagrammatic, showing one form of embodiment of the egg-holding tray for incubation; however, it is not intended to limit the scope of the invention, which is only limited to that set out in the set of claims.

Referring to FIGS. 1-6, a egg-holding tray for incubation (1) is intended to accommodate eggs in a rectangular shape (2) with rounded corners (3) bordered by parallel walls and a lower part of these walls comprises a protruding rectangular border (4). The internal area of the tray (1) comprises a set of laterally juxtaposed aureoles (100), each with the same structure, that fill the entire area of the tray (1). Each individual aureole (100) includes a lower concentric ring (5) beneath an upper ring (6), the lower ring (5) has a circular shape which can have a plurality of supports, herein four equidistant, spaced apart orthogonal supports (7)(8)(9)(10) located on an internal face (11). Each support (7)(8)(9)(10) has a vertical (in a direction between associated lower rings (5) to the upper rings (6)) triangular shape with a rounded upper end (12) that can be narrower than a base of the support. A concave surface (13) correlates to or faces in the same direction as the inside circumference of the lower ring (5) such that it accommodates eggs under the force exerted by the weight of the egg preventing the egg from moving around in the aureole (100).

An external face (14) of the lower ring (5) has a set of columns, specifically six columns (15)(16)(17)(18)(19)(20) which extend vertically to constitute the vertices that form the upper ring (6) which has a hexagonal perimeter (21), each of the edges of this upper ring (6) are shared with another upper ring (6). The edges of the surface of the upper ring (6) forming the sides of a hexagonal perimeter each can have a cavity or recess formed therein such as in the center (22) of each side. The perimeter edge of the recess can be an arc such as circular, where a portion of the recess perimeter remote from rectilinear lateral segments (23)(24) of the upper ring (6) adjacent the recess is thinner than the rectilinear lateral segments (23)(24).

Between the lower ring (5) and the upper ring (6) separated by the six columns there are a total of six trapezoidal hollow regions (25) per aureole (100) which is compatible with the hexagonal shape of the upper ring (6).

Figure 3:
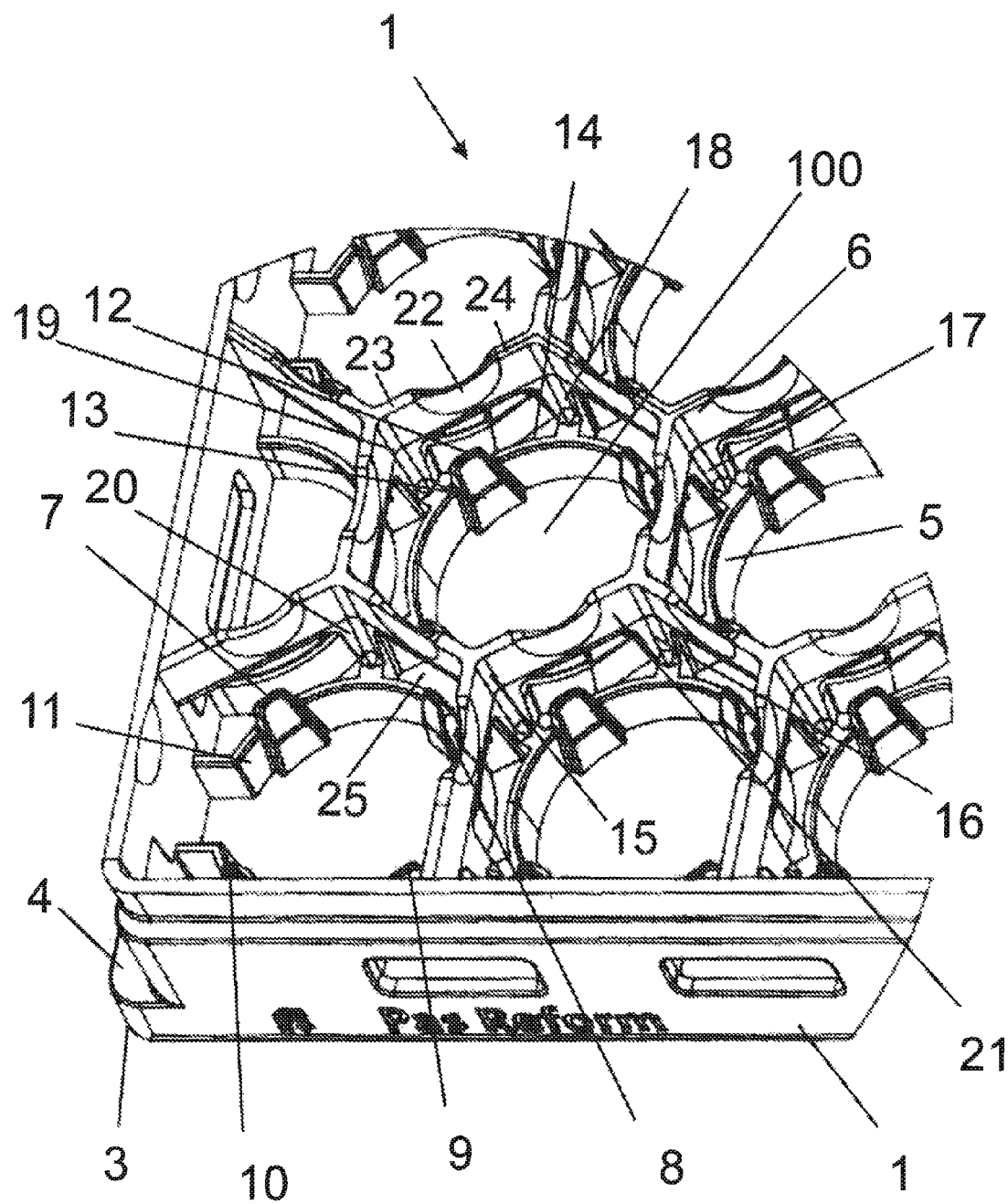
FIG. 3 depicts a partial view of the tray with its characteristics.
Figure 4:
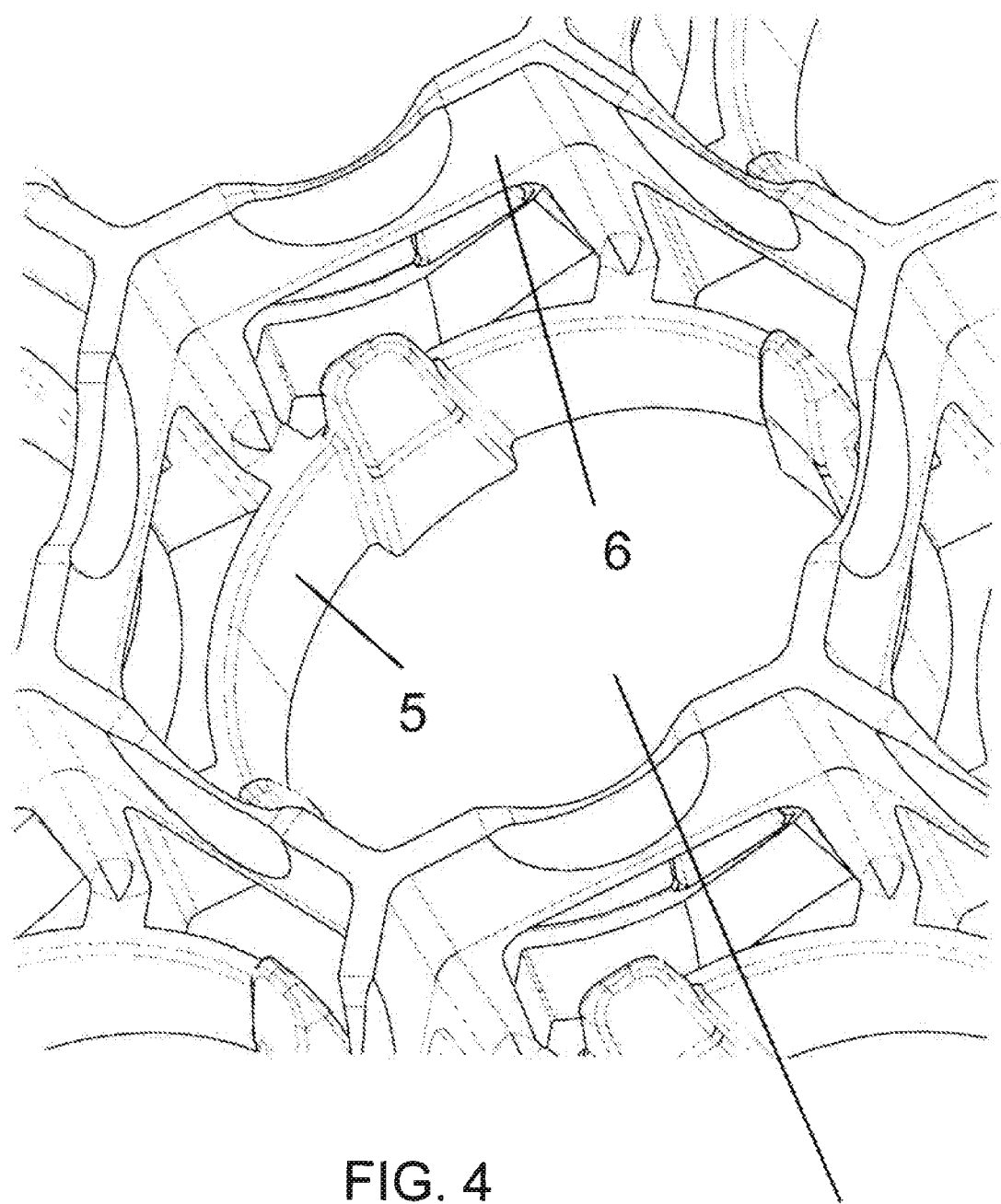
FIG. 4 depicts an aureole showing a lower circular ring and a upper hexagonal ring.
Figure 5:
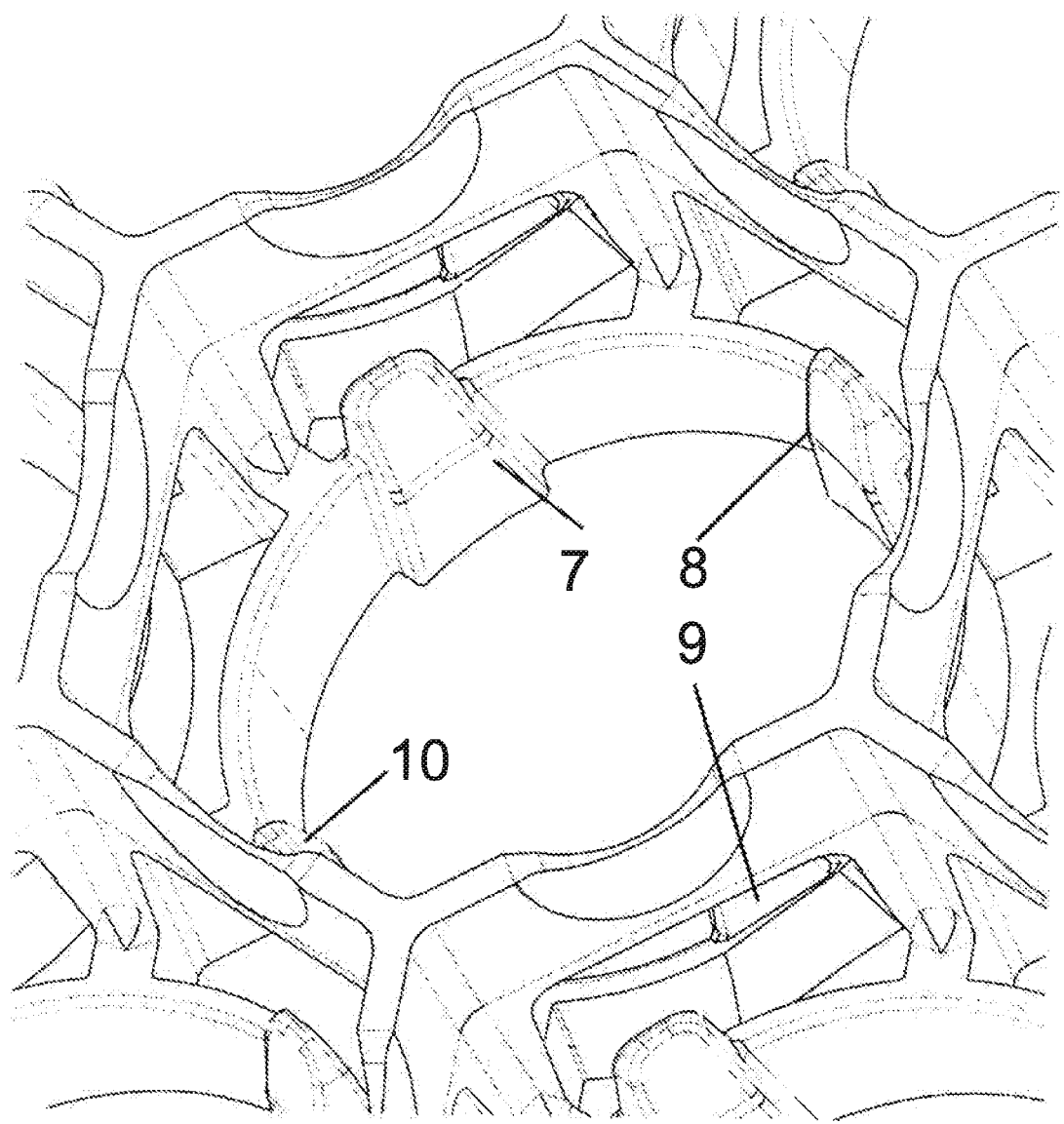
FIG. 5 depicts a lower ring of the aureole with the egg-holding supports.
Figure 6:
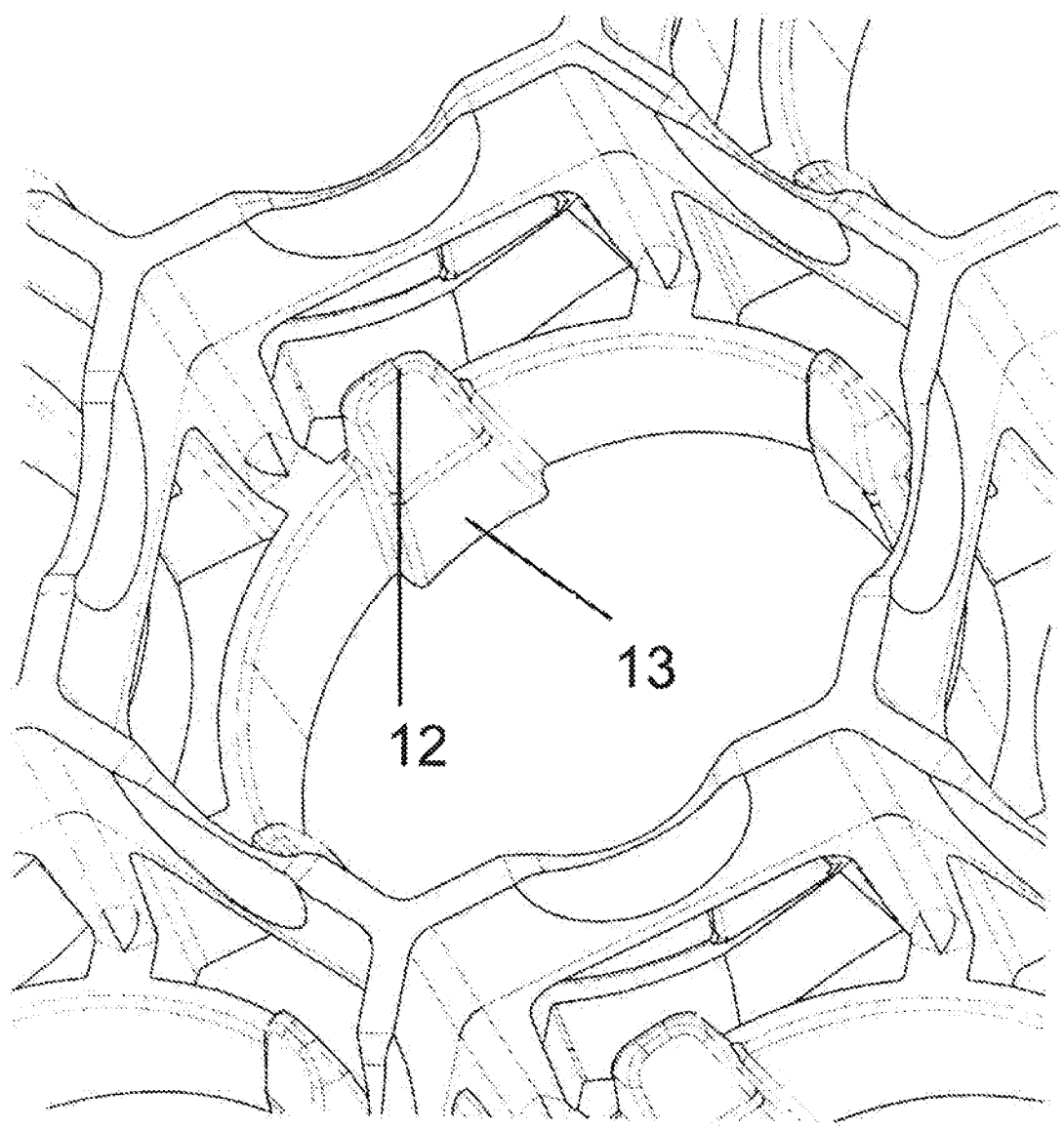
FIG. 6 depicts a shape of the supports of the lower ring of each aureole.
Figure 7:
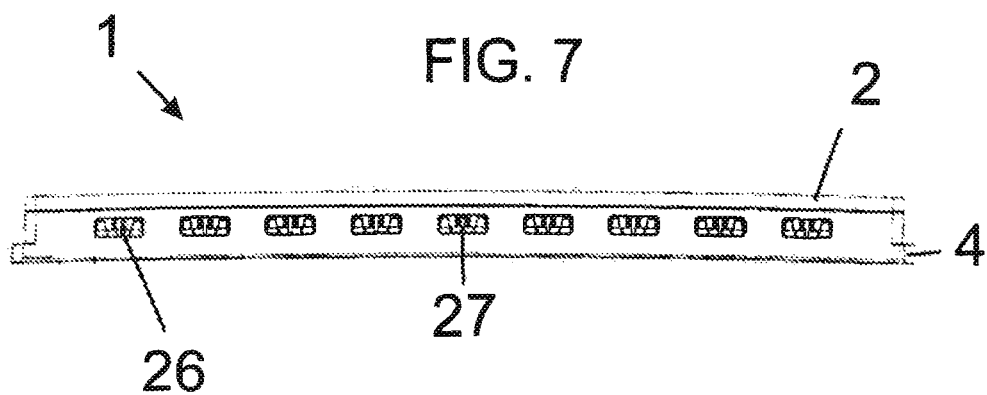
FIG. 7 depicts a side view of the tray.

Referring to FIG. 3, the smaller sides of the tray (1) have a sequence of nine rectangular ventilation openings (26) arranged in such a way that their central point (27) is aligned with two of the support columns and consequently with two of the vertices of the hexagon of each upper ring (6) of the aureoles (100).

Figure 8:
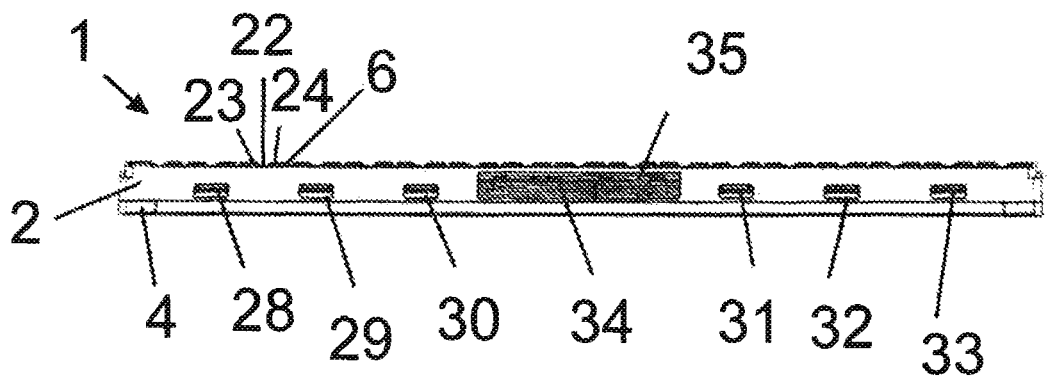
FIG. 8 depicts a transverse side view of the tray.

Whereas the longer sides of the tray (1) (FIG. 8) can have two sets of cavities, herein three rectangular cavities (28)(29)(30)(31)(32)(33), that are transversally aligned with the center of the cavities of each aureole between the lower ring (5) and upper ring (6). A solid region (34) separates each set of three cavities on the longer sides. Region 34 can have longitudinal grooves (35) which provide a level of rigidity suitable for the length of the tray (1).

Due to the hexagonal shape of the upper ring (6) the aureoles (100) in the inner area of the tray (1) form a mesh that could be compared to the structure of a beehive. The hexagonal shape makes it possible to create a tray with 162 aureoles (100).

The lateral openings and the cavities between the lower ring (5) and the upper ring (6) of each aureole (100) allow the flow of warm air such that the temperature is the same in all of the aureoles (100) in the inner area of the tray.

Although the subject matter has been described in language specific to structural features and/or methodological acts, it is to be understood that the subject matter defined in the appended claims is not necessarily limited to the specific features or acts described above as has been held by the courts. Rather, the specific features and acts described above are disclosed as example forms of implementing the claims.

What is claimed is:

1. An egg-holding tray intended to accommodate eggs, the tray comprising an array of annular egg seats, each egg seat comprising a lower ring and an upper ring fixed to the lower ring, the lower ring being concentrically below the upper ring, each annular egg seat having a plurality of supports on an internal face of one of the rings, wherein each of the supports have a triangular shape.

2. The egg-holding tray of claim 1, wherein the supports have a concave egg supporting surface that correlates to an inside circumference of the lower ring such that the supports accommodate eggs under the force exerted by the weight of the egg, inhibiting the egg from moving around in the annular egg seat.

3. The egg-holding tray of claim 1, wherein the supports have a rounded upper end.

4. An egg holding tray, the tray comprising an outer perimeter defining an inner area of the tray, the inner area comprising a plurality of annular egg seats, each annular egg seat comprising an upper ring fixed to a lower ring, the upper ring having a generally annular perimeter, the lower ring positioned beneath the upper ring, each lower ring aligned concentrically with each associated upper ring and comprising a generally annular perimeter, and a plurality of supports located on an internal face of one of the rings, wherein the outer perimeter includes a plurality of openings, wherein each opening opens to two adjacent annular egg seats.

5. The egg-holding tray, in accordance with claim 4, wherein the upper ring is joined to the lower ring with a plurality of support columns which extend vertically at locations constituting vertices that form the upper ring.

6. The egg-holding tray, in accordance with claim 5, wherein the annular perimeter of the upper ring is hexagonal, and wherein each edge of the hexagonal perimeter has a perimeter edge cavity in the shape of an arc that is thinner than rectilinear lateral segments on opposite sides of each associated perimeter edge cavity.

7. The egg-holding tray, in accordance with claim 5, wherein the outer perimeter is rectangular, wherein a first pair of opposite facing walls of the tray comprise a plurality of openings configured such that a central point of each opening is aligned with at least two of the support columns.

8. The egg-holding tray, in accordance with claim 7, wherein a second pair of opposite facing walls of the tray are configured with a plurality of wall cavities that are aligned with centers between the lower ring and the upper ring of adjacent annular egg seats.

9. The egg-holding tray, in accordance with claim 8, wherein the openings and the wall cavities between the lower ring and the upper ring of each annular egg seat are configured to allow warm air to flow such that a temperature is the same in all of the annular egg seats in the inner area of the tray, providing improved ventilation to the tray.

10. The egg holding tray of claim 5, wherein the plurality of support columns comprises six support columns that define a hexagonal perimeter.

11. The egg holding tray of claim 10, wherein each upper ring comprises hexagonal edges, such that hexagonal edges of each upper ring are shared with adjacent annular egg seats.

12. The egg-holding tray, in accordance with claim 4, wherein each annular egg seat includes a plurality of spaced apart hollow regions that open to inner spaces of adjacent annular egg seats.

13. The egg holding tray of claim 4, wherein the annular perimeter of the upper ring is hexagonal.

14. The egg holding tray of claim 4, wherein the outer perimeter comprises two pairs of opposite facing sides, the plurality of openings being disposed on a first pair of opposite facing sides.

15. The egg holding tray of claim 14, wherein a second pair of opposite facing sides of the outer perimeter includes a second plurality of openings, each opening of the second plurality of openings being aligned with centers of adjacent annular egg seats.

16. An egg holding tray, the tray comprising an outer perimeter defining an inner area of the tray, the inner area comprising a plurality of annular egg seats, each annular egg seat comprising an upper ring fixed to a lower ring, the upper ring having a generally annular perimeter, the lower ring positioned beneath the upper ring, each lower ring aligned concentrically with each associated upper ring and comprising a generally annular perimeter, and a plurality of supports located on an internal face of one of the rings, wherein the plurality of supports on the lower ring comprise supports spaced apart from each other at equal angular intervals, each support having a concave surface facing inwardly and configured to accommodate an egg under a force exerted by a weight of the egg, inhibiting the egg from moving around in the annular egg seat.

17. An egg holding tray, the tray comprising an outer perimeter defining an inner area of the tray, the inner area comprising a plurality of annular egg seats, each annular egg seat comprising an upper ring fixed to a lower ring, the upper ring having a generally annular perimeter, the lower ring positioned beneath the upper ring, each lower ring aligned concentrically with each associated upper ring and comprising a generally annular perimeter, and a plurality of supports located on an internal face of one of the rings, wherein each annular egg seat comprises a plurality of walls extending between associated upper and lower rings, and wherein each wall includes an opening extending between adjacent annular egg seats.

* * * * *